(12) United States Patent
Lee et al.

(10) Patent No.: US 9,638,946 B2
(45) Date of Patent: May 2, 2017

(54) MULTI-DISPLAY DEVICE

(71) Applicant: Samsung Display Co., Ltd., Yongin-si, Gyeonggi-do (KR)

(72) Inventors: Chung Hui Lee, Cheongju-si (KR); Gyu Su Lee, Asan-si (KR); Seung Won Kuk, Cheonan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 269 days.

(21) Appl. No.: 14/613,826

(22) Filed: Feb. 4, 2015

(65) Prior Publication Data

US 2016/0062163 A1 Mar. 3, 2016

(30) Foreign Application Priority Data

Sep. 2, 2014 (KR) .......................... 10-2014-0116293

(51) Int. Cl.
| | |
|---|---|
| *G02F 1/03* | (2006.01) |
| *G02F 1/07* | (2006.01) |
| *G02F 1/153* | (2006.01) |
| *G02F 1/1333* | (2006.01) |
| *G02F 1/1335* | (2006.01) |
| *G02B 17/00* | (2006.01) |
| *G09F 9/30* | (2006.01) |

(52) U.S. Cl.
CPC ......... *G02F 1/13336* (2013.01); *G02B 17/00* (2013.01); *G02F 1/133553* (2013.01); *G09F 9/301* (2013.01)

(58) Field of Classification Search
CPC ............... G02F 1/03; G02F 1/07; G02F 1/153
USPC ........ 359/242–247, 265–274, 277, 252–254, 359/290–292, 295, 296, 298, 315, 318
See application file for complete search history.

(56) References Cited

FOREIGN PATENT DOCUMENTS

| | | |
|---|---|---|
| JP | 2012-150366 | 9/2012 |
| KR | 1020040050433 | 6/2004 |
| KR | 1020090089727 | 8/2009 |
| KR | 1020110048173 | 5/2011 |
| KR | 1020120004648 | 1/2012 |

*Primary Examiner* — Bumsuk Won
*Assistant Examiner* — Tamara Y Washington
(74) *Attorney, Agent, or Firm* — Robert E. Bushnell, Esq.

(57) ABSTRACT

A multi-display device includes: a plurality of display devices disposed adjacent to each other; and a plurality of optical apparatuses disposed on at least a part of a display area and a non-display area of a respective one of the plurality of display devices, wherein each of the plurality of optical apparatuses comprises: a transparent body having a side surface substantially perpendicular to one surface of the display device and a first inclined surface disposed to face the non-display area; and a reflective member disposed on the side surface and the first inclined surface.

20 Claims, 12 Drawing Sheets

MULTI-DISPLAY DEVICE

CLAIM OF PRIORITY

This application claims priority to and all the benefits accruing under 35 U.S.C. §119 of Korean Patent Application No. 10-2014-0116293, filed on Sep. 2, 2014, with the Korean Intellectual Property Office ("KIPO"), the disclosure of which is incorporated herein in its entirety by reference.

BACKGROUND OF THE INVENTION

Field of the Invention

Aspects of embodiments of the present invention relate to a multi-display device designed so that a non-display area between respective display devices composing the multi-display device is not seen.

Description of the Related Art

Examples of display devices may include a liquid crystal display (LCD), an organic light emitting diode (OLED) display, a plasma display panel (PDP), an electrophoretic display (EPD), and the like, according to a light emitting method.

In recent years, a plurality of display devices may be combined in a tiling method to form a multi-display device having a relatively large screen in order to provide a variety of information and advertisements. It is important that non-display areas between the respective display devices may not be seen so that the multi-display devices may appear as one screen in total.

In order to have the non-display areas between the respective display devices not seen, a multi-display device that includes an optical apparatus having a triangular cross-section on the non-display area has been used.

However, when the multi-display device including the optical apparatus having a triangular cross-section is used, the non-display area may not be seen in the case where a viewer views the multi-display device from the front side. In contrary, in the case where the viewer views the multi-display device from the side, the non-display area may be disadvantageously seen.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure of invention is directed to a multi-display device designed so that a non-display area between respective display devices is not seen when a viewer views the multi-display device from the front and side.

According to an embodiment of the present invention, a multi-display device includes: a plurality of display devices disposed adjacent to each other; and optical apparatuses on at least a part of a display area and a non-display area of a respective one of the plurality of display devices, wherein the optical apparatus comprises: a transparent body having a side surface substantially perpendicular to one surface of the display device and a first inclined surface disposed to face the non-display area; and a reflective member on the side surface and the first inclined surface.

The optical apparatus may be symmetric with respect to a boundary surface between the plurality of display devices.

The optical apparatus may further include a second inclined surface between the side surface and the first inclined surface.

The multi-display device may further include an adhesive between the first inclined surface and the non-display area.

The optical apparatus may further include a second inclined surface between the side surface and a lower surface.

The multi-display device may further include an adhesive between the lower surface and the display area.

The first inclined surface may have an inclination angle of 10 to 80 degrees.

The second inclined surface may have an inclination angle of 10 to 80 degrees.

The optical apparatus may have a convexly formed upper surface.

The optical apparatus may have a concavely formed upper surface.

The transparent body may include at least one substance selected from polycarbonate (PC), polymethylmethacrylate (PMMA), acrylonitrile-butadiene-styrene (ABS) copolymer and acrylic resins.

The reflective member may include at least one substance selected from gold (Au), silver (Ag), copper (Cu), aluminum (Al), chromium (Cr), titanium (Ti), and alloys thereof.

According to embodiments of the present invention, a non-display area between respective display devices of a multi-display device may not be seen when a viewer views the multi-display device from the front and side.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION OF THE INVENTION

Hereinafter, embodiments of the present disclosure of invention will be described in more detail with reference to the accompanying drawings.

Although the present invention can be modified in various manners and have several embodiments, specific embodiments are illustrated in the accompanying drawings and will be mainly described in the specification. However, the scope of the embodiments of the present invention is not limited to the specific embodiments and should be construed as including all the changes, equivalents, and substitutions included in the spirit and scope of the present invention.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Some of the parts which are not associated with the description may not be provided in order to specifically describe embodiments of the present invention, and like reference numerals refer to like elements throughout the specification.

Figure 10:
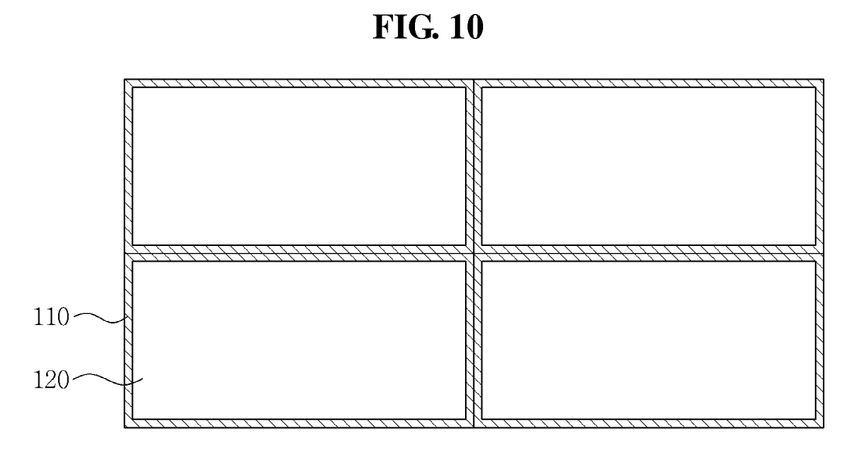
FIG. 10 is a front view of a conventional multi-display device.
Figure 11:
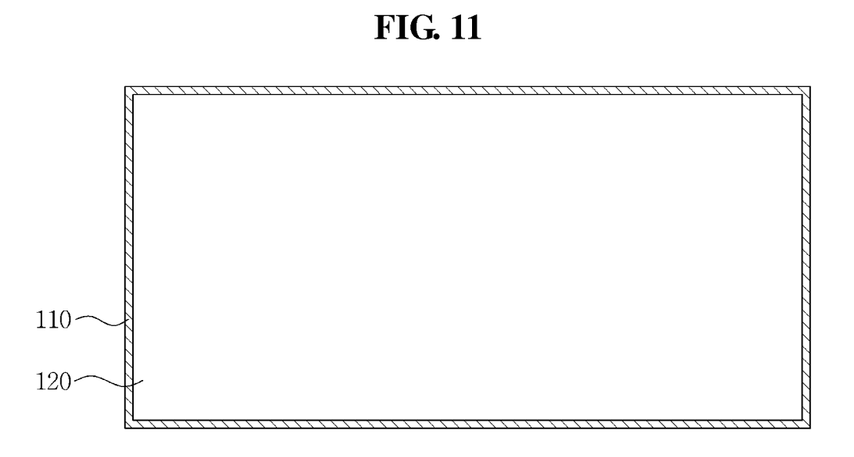
FIG. 11 is a front view of a multi-display device of the present invention.

In conventional multi-display device (FIG. 10), the non-display areas due to the upper frames (110) between the display panels (120) can be seen from a front view, lowering the quality of a displayed image and misinterpreting the displayed image. Conventional multi-display device having optical apparatuses with triangular cross-sections can remove the visibility of the non-display areas from a front view but the non-display areas can still be seen from a side view (not shown). FIG. 11 shows a multi-display device of the present invention, and the non-display area cannot be seen from a front view and a side view (not shown).

Figure 1:
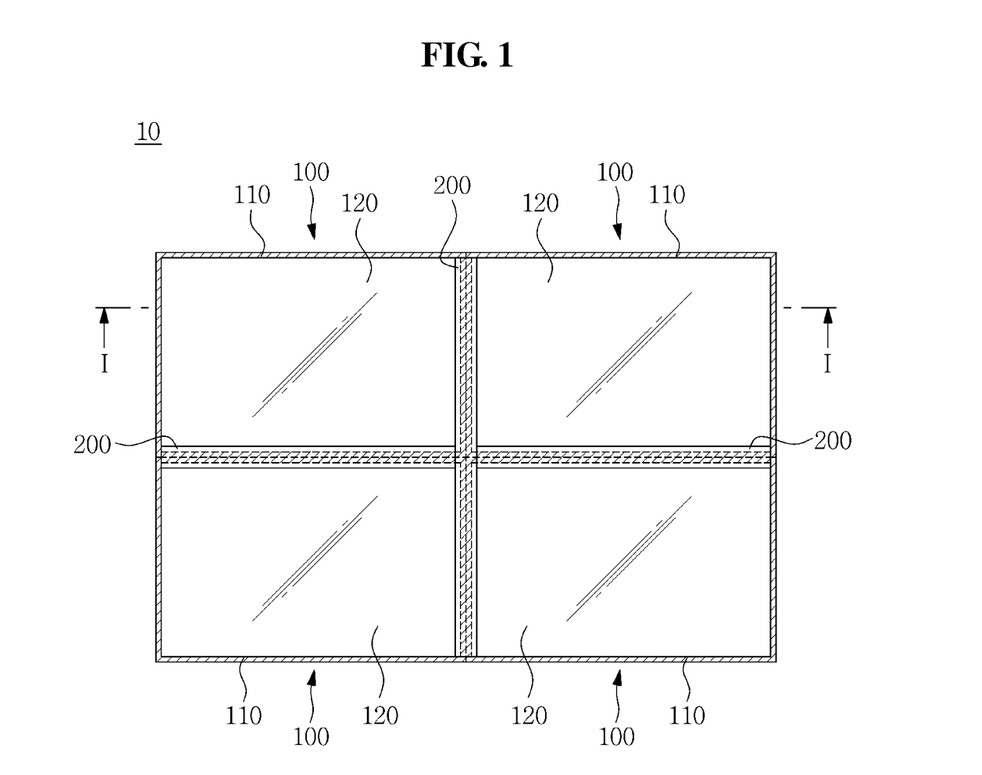
FIG. 1 is a schematic plan view illustrating a multi-display device according to a first embodiment of the present invention.
Figure 2:
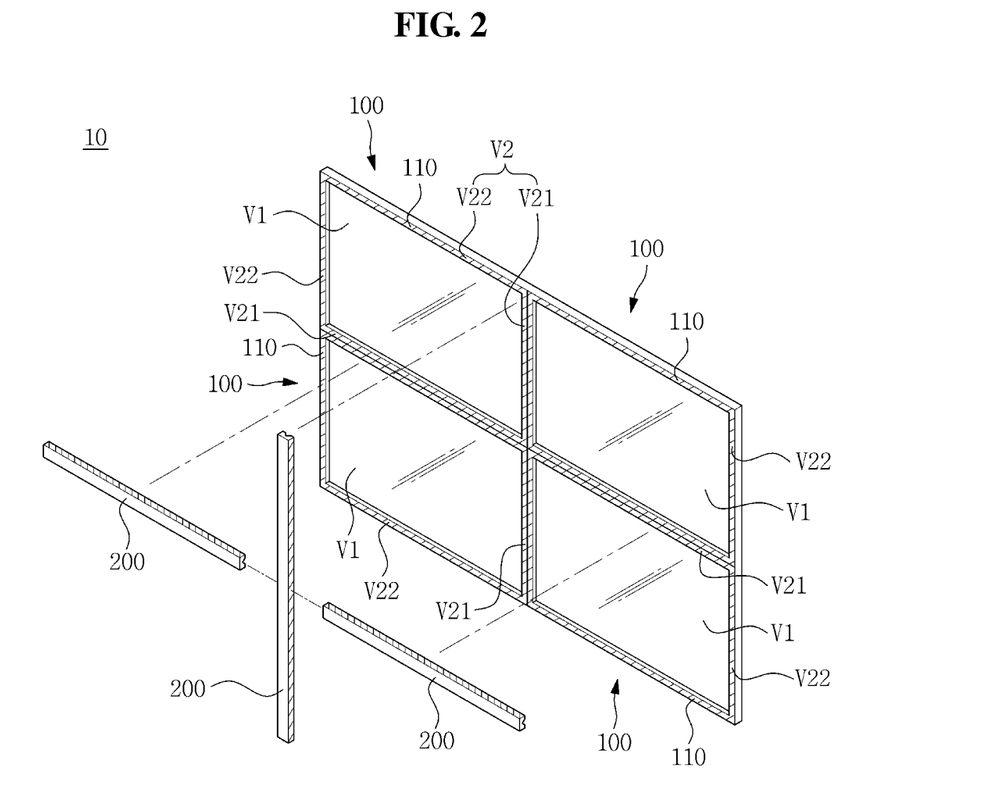
FIG. 2 is a schematic perspective view illustrating the multi-display device according to the first embodiment of the present invention.

FIG. 1 is a schematic plan view illustrating a multi-display device according to a first embodiment of the present invention and FIG. 2 is a schematic perspective view illustrating the multi-display device according to the first embodiment of the present invention.

Referring to FIGS. 1 and 2, a multi-display device 10 according to the first embodiment of the present invention may include a plurality of display devices 100 disposed adjacent to each other and an optical apparatus 200 disposed on a part of a display area and a non-display area of the plurality of display devices 100.

The plurality of display devices 100 may be combined in a tiling method.

Each display device 100 may display an image divided according to an arrangement of the plurality of display devices 100. As each of the display devices 100 displays the divided image, the multi-display device 10 may display one image.

In FIGS. 1 and 2, four display devices 100 are combined in a 2×2 matrix form to form the multi-display device 10, but embodiments of the present invention are not limited thereto. Thus, the plurality of display devices 100 may be disposed in parallel in a longitudinal or lateral direction.

Further, the display device 100 may be an LCD device including an upper frame 110, a display panel 120, a backlight unit (not illustrated), and the like, but embodiments of the present invention are not limited thereto. Thus, various display devices, such as an OLED display, a PDP, and an electrophoretic display, may be used as the display device 100.

The upper frame 110 may have a quadrilateral frame form to cover an upper edge portion and side surfaces of the display panel 120.

Hereinafter, a center portion of the display panel 120 that is not covered by the upper frame 110 is called a display area V1. Further, a region other than V1 including the edge portion of the display panel 120 covered by the upper frame 110 is called a non-display area V2.

The non-display area V2 may be divided into a first non-display area V21 disposed between adjacent display areas V1 of the respective display devices 100 and a second non-display area V22 disposed at the outline of the multi-display device 10 surrounding the display areas V1 and the first non-display areas V21.

The optical apparatus 200 according to the first embodiment of the present invention may be disposed on at least a part of the display area V1 and the first non-display area V21, such that the first non-display area V21 may not be seen by a viewer from the front and sides. That is, the first non-display area V21 between the respective display devices 100 may not be seen, such that the image displayed on the multi-display device 10 may appear as one screen in total. The configurations of the optical apparatus 200 will be described below in detail.

Figure 3:
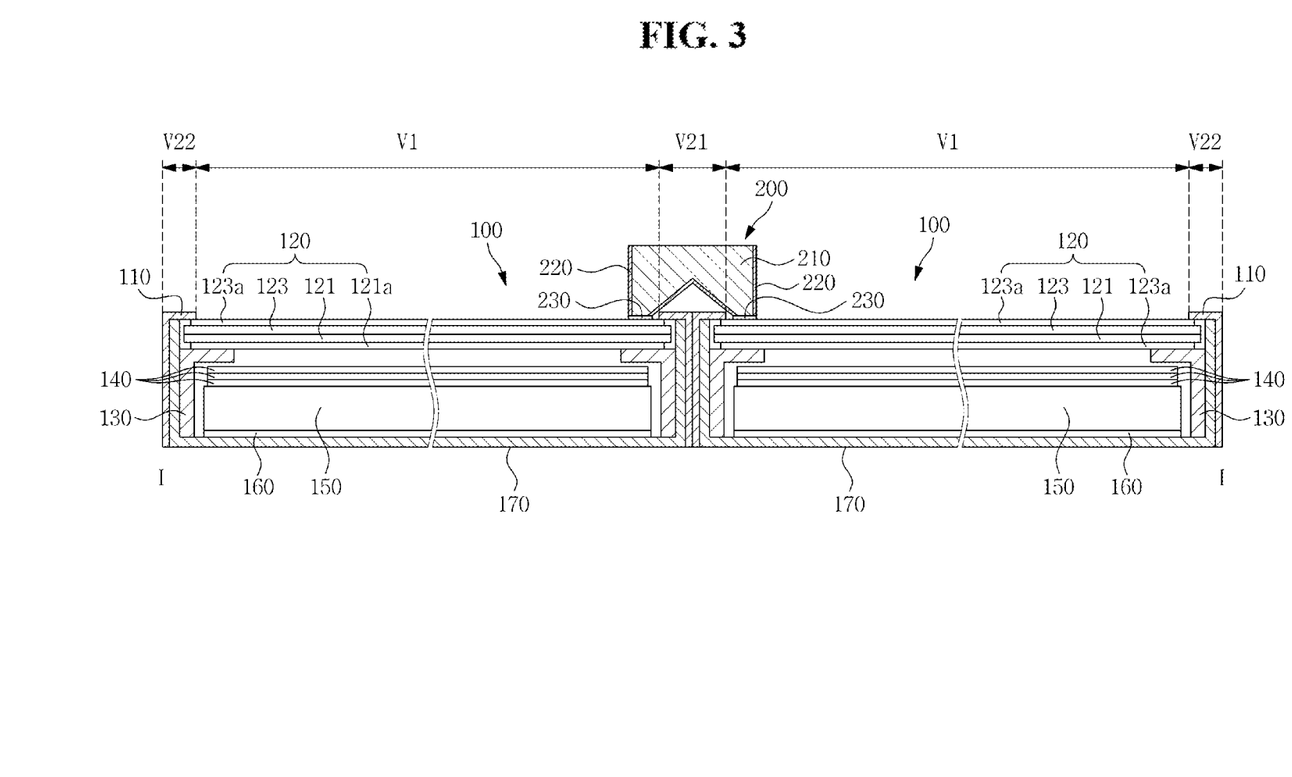
FIG. 3 is a cross-sectional view taken along a line I-I' of FIG. 1.

FIG. 3 is a cross-sectional view taken along a line I-I' of FIG. 1.

Referring to FIG. 3, the display device 100 according to one embodiment of the present invention may include: an upper frame (or a top chassis) 110, a display panel 120, a middle frame (or a mold frame) 130, an optical sheet 140, a light guide plate 150, a reflective sheet 160, and a lower frame (or a bottom chassis) 170. Hereinafter, a backlight unit is to be understood as having a concept including the middle frame 130, the optical sheet 140, the light guide plate 150, the reflective sheet 160, and the lower frame 170.

The upper frame 110 may have an opening through which the display area V1 of the display panel 120 can be exposed to the outside and may be disposed to cover the edge portion of the upper surface and the side surfaces of the display panel 120.

The upper frame 110 may be configured to fix the edge portion of the upper surface of the display panel 120 and prevent separation of the display panel 120 from the backlight unit. The upper frame 110 may be fixed to the middle frame 130 and the lower frame 170 by hooks and/or screws.

The upper frame 110 may be formed of a metal material having rigidity properties such as stainless steel or a material having good heat dissipation properties such as aluminum or an aluminum alloy.

The display device 120 may include a first substrate 121, a second substrate 123 disposed to face the first substrate 121, and a liquid crystal layer (not illustrated) disposed between the first and second substrates 121 and 123.

The first substrate 121 may include a plurality of pixel electrodes arranged in a matrix form, a thin film transistor (TFT) configured to apply a driving voltage to the respective pixel electrodes, and various signal lines configured to drive the pixel electrodes and the TFT.

The second substrate 123 may be disposed to face the first substrate 121 and include a common electrode formed of a transparent conductive material and a color filter. The color filter has types of red, green, and blue color filters.

The liquid crystal layer (not illustrated) may be interposed between the first and second substrates 121 and 123 and rearranged in accordance with an electric field formed between the pixel electrode and the common electrode. Accordingly, the rearranged liquid crystal layer may adjust transmittance of light emitted from the backlight unit and the adjusted light may pass through the color filter, thereby displaying an image.

In addition, lower and upper polarizers 121a and 123a may be respectively disposed on a bottom surface of the first substrate 121 and on an upper surface of the second substrate 123. The upper and lower polarizers 123a and 121a may have areas corresponding to the display panel 120. The upper polarizer 123a may only allow light having a predetermined polarization direction among light incident from the outside to pass through and absorb or block other light. The lower polarizer 121a may only allow light having a predetermined polarization direction among light emitted from the backlight unit to pass through and absorb or block other light.

The middle frame 130 may have a quadrilateral-loop form, and accommodate and support the display panel 120, the optical sheet 140, the light guide plate 150, and the like. The middle frame 130 may be formed as a single unit but a plurality of units may be assembled to form the mold frame middle frame 140, where necessary.

The optical sheet 140 may be disposed on the light guide plate 150 and configured to diffuse and/or collect light transmitted from the light guide plate 150. The optical sheet 140 may include diffusion, prism, and protective sheets. In FIG. 1, the optical sheet 140 is provided with three optical sheets 140; however, two, four, or more optical sheets may be provided.

The diffusion sheet may be configured to disperse light incident from the light guide plate 150 so as to prevent the light from being partly concentrated.

The prism sheet may include prisms having a triangular cross-section and aligned in a predetermined arrangement on one surface thereof. The prism sheet may be disposed on the diffusion sheet and may collect light diffused from the diffusion sheet in a direction perpendicular to the display panel 120.

The protective sheet may be formed on the prism sheet, protect a surface of the prism sheet, and diffuse light to achieve a uniform light distribution.

The light guide plate 150 may be configured to uniformly supply light supplied from the light source to the display panel 120. The light guide plate 150 may be formed to have a quadrilateral panel form, but is not limited thereto. Thus, in a case where an LED chip is used as the light source, the light guide plate 150 may have various forms including a predetermined groove and/or a protrusion according to a position of the light source.

The light guide plate 150 is described as a plate for ease of description, but it may be provided in a sheet or film form to achieve slimness of display devices. In other words, the light guide plate 150 is to be understood as having a concept that includes not only a plate but also a film for guiding light.

The light guide plate 150 may be formed of a light-transmissive material including, for example, acrylic resins, such as polymethylmethacrylate (PMMA), or polycarbonate (PC) so as to guide light efficiently.

The reflective sheet 160 may be disposed between the light guide plate 150 and the lower frame 170. The reflective sheet 160 may reflect light emitted downwards from the light guide plate 150 to the display panel 120, thereby enhancing light efficiency.

The reflective sheet 160 may be formed of, for example, polyethylene terephthalate (PET) so as to achieve reflectivity. Further, one surface of the reflective sheet may be coated with a diffusion layer containing, for example, titanium dioxides. Further, the reflective sheet 160 may be formed of a material containing metal, such as silver (Ag).

The lower frame 170 may be formed of a metal material having rigidity properties, such as stainless steel, or a material having good heat dissipating properties, such as aluminum or aluminum alloys. The lower frame 170 may be configured to maintain a framework of the display device and protect a variety of components accommodated therein.

Figure 4:
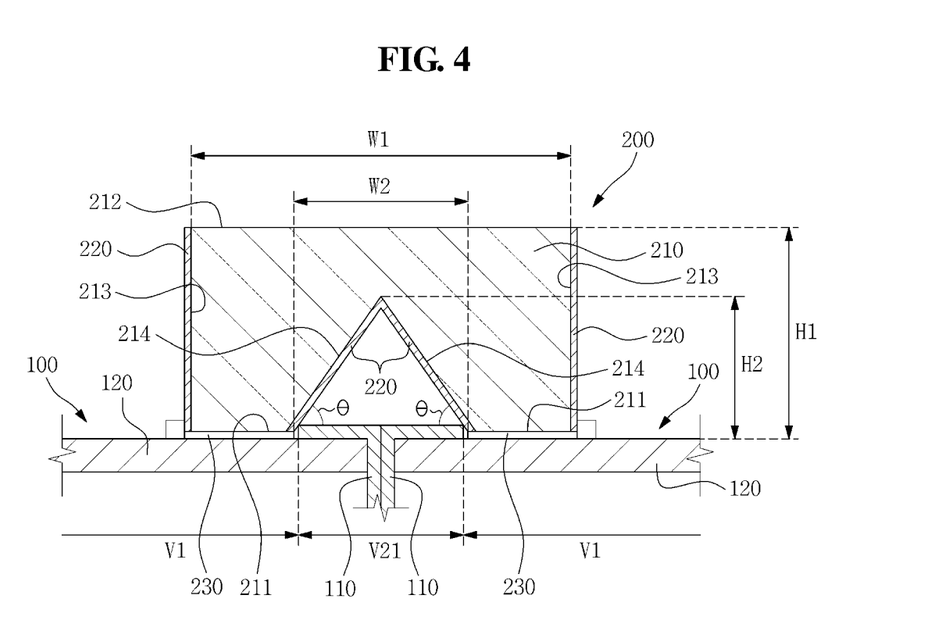
FIG. 4 is an enlarged cross-sectional view illustrating an optical apparatus according to the first embodiment of the present invention.

FIG. 4 is an enlarged cross-sectional view illustrating an optical apparatus according to the first embodiment of the present invention.

Referring to FIG. 4, the optical apparatus 200 according to the first embodiment of the present invention may include a transparent body 210 disposed on an edge portion of the display area V1 and the first non-display area V21 of the display device 100, a reflective member 220 disposed on at least one surface of the transparent body 210, and an adhesive 230 configured to fix the transparent body 210 to the multi-display device.

The transparent body 210 may have a bar form extended along the edge portion of the display area V1 and the first non-display area V21.

The transparent body 210 may have a pair of side surfaces 213 substantially perpendicular to one surface of the display device 100, a pair of first inclined surfaces 214 disposed to face the first non-display area V21, a pair of lower surfaces 211 between the side surface 213 and the first inclined surface 214, and an upper surface 212 disposed to face the lower surface 211. An angle θ between the first inclined surface 214 and the display device 100 may be about 10 to 80 degrees. The first inclined surface may have an inclination angle of about 10 to 80 degrees.

The one pair of lower surfaces 211 may be disposed on the edge portion of the display area V1 of the display device 100 and the one pair of first inclined surfaces 214 may be disposed on the first non-display area V21. In other words, the one pair of lower surfaces 211 may be disposed on the edge portion of the plurality of display panels 120 disposed adjacent to each other and the one pair of first inclined surfaces 214 may be disposed on the upper frame 110 of the plurality of display panels 120 disposed adjacent to each other. Accordingly, the transparent body 210 may be symmetrically disposed with respect to a boundary between the respective display devices 100.

A width W1 of the upper surface 212 of the transparent body 210 may be larger than a width of the non-display area V21 between the display devices 100. A width W2 of the first inclined surface 214 of the transparent body 210 may be substantially the same as the width of the non-display area V21 between the display devices 100.

The width W1 of the transparent body 210, the width W2 of the first inclined surface 214, a height H1 of the transparent body 210, a height H2 of the first inclined surface 214 may vary in accordance with the width of the non-display area V21 between the display devices 100.

For example, in a case where the width of the non-display area V21 between the display devices 100 is 2 mm, the width W1 of the transparent body 210 may be about 3.5 mm or more and 4.5 mm or less and the width W2 of the first inclined surface 214 may be about 2.0 mm or more and 2.5 mm or less.

Further, the height H1 of the transparent body 210 may be about 2.5 mm or more and 3.5 mm or less and the height H2 of the first inclined surface 214 may be about 2.0 mm or more and 2.5 mm or less.

The transparent body 210 may include at least one substance selected from polycarbonate (PC), polymethylmethacrylate (PMMA), acrylonitrile-butadiene-styrene (ABS) copolymer and acrylic resins.

The reflective member 220 may be disposed on the side surface 213 of the transparent body 210 and the first inclined surface 214. The reflective member 220 may include at least one substance selected from gold (Au), silver (Ag), copper (Cu), aluminum (Al), chromium (Cr), titanium (Ti), and alloys thereof. The reflective member 220 may be formed using many different methods, such as a deposition process, a coating process, a painting process, and a film attachment process.

The adhesive 230 may be disposed between the lower surface 211 of the transparent body 210 and the display panel 120. Any transparent adhesive may be used as the adhesive 230 without limitation. For example, the adhesive 230 may be an optical clear adhesive (OCA) or an optical clear resin (OCR).

In FIG. 4, the transparent body 210 is fixed to the display panel 120 using the adhesive 230, but embodiments of the present invention are not limited thereto. Thus, the transparent body 210 may be fixed to the display panel 120 using various fixing means.

Figure 5:
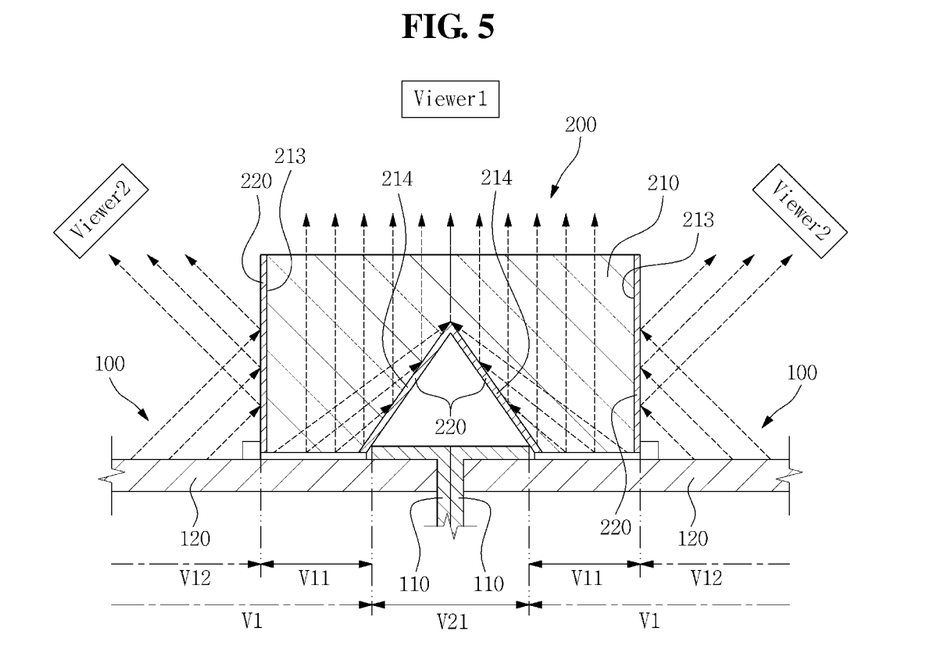
FIG. 5 is a cross-sectional view illustrating an image display in accordance with viewing angles of the multi-display device according to the first embodiment of the present invention.

FIG. 5 is a cross-sectional view illustrating an image display in accordance with viewing angles of the multi-display device according to the first embodiment of the present invention. In FIG. 5, dashed arrows represent a propagation direction of light emitted from the display panel 120.

Referring to FIG. 5, the display device 100 may be divided into the display area V1 and the first non-display area V21 between the respective display devices 100. The display area V1 may be divided into a first display area V11 in contact with the transparent body 210 and a second display area V12 not in contact with the transparent body 210.

Light emitted from the first display area V11 of the display panel 120 may not only propagate frontwards but also propagate toward the first non-display area V21 being reflected off of the reflective member 220 on the first inclined surface 214.

Further, light emitted from the second display area V12 of the display panel 120 may not only propagate frontwards but also propagate sidewards being reflected off the reflective member 220 on the side surface 213.

Accordingly, the first non-display area V21 may not be seen by a viewer 1 located in front of the multi-display device and also by a viewer 2 located on the sides with respect to a center portion of the multi-display device.

Figure 6:
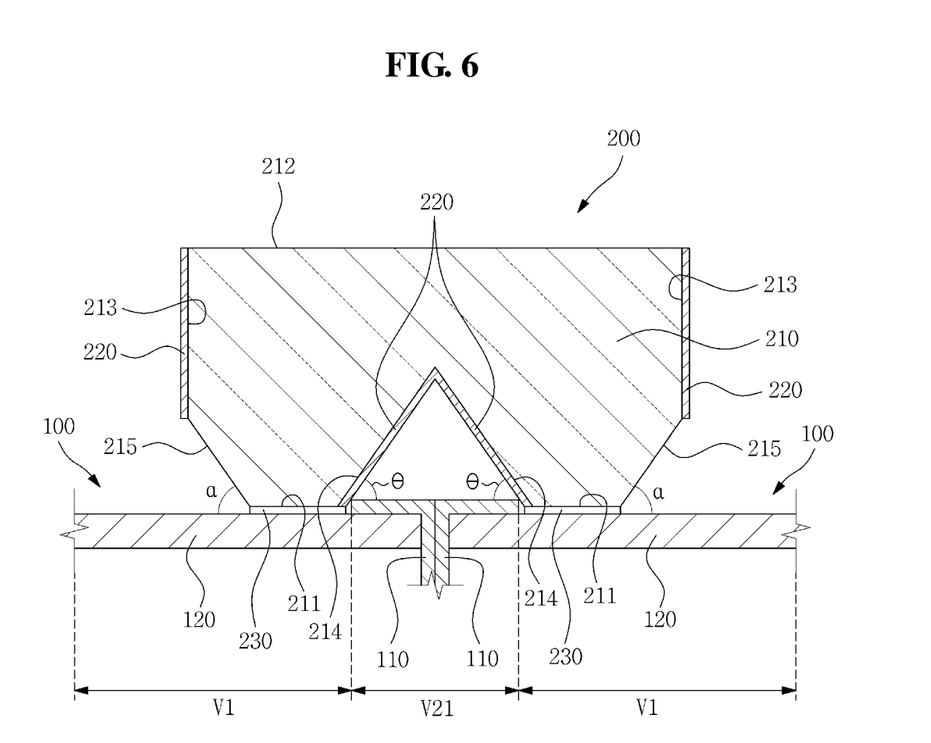
FIG. 6 is an enlarged cross-sectional view illustrating an optical apparatus according to a second embodiment of the present invention.

FIG. 6 is an enlarged cross-sectional view illustrating an optical apparatus according to a second embodiment of the present invention. Hereinafter, the repeated descriptions of the optical apparatus according to the first embodiment of the present invention will be omitted.

Referring to FIG. 6, the optical apparatus 200 according to the second embodiment of the present invention may include a transparent body 210 disposed on the edge portion of the display area V1 and the first non-display area V21 of the display device 100, a reflective member 220 disposed on at least one surface of the transparent body 210, and an adhesive 230 configured to fix the transparent body 210 to the multi-display device.

The transparent body 210 may have a bar form extended along the edge portion of the display area V1 and the first non-display area V21.

The transparent body 210 may have a pair of side surfaces 213 substantially perpendicular to one surface of the display device 100, a pair of first inclined surfaces 214 disposed to face the first non-display area V21, a pair of lower surfaces 211 between the side surface 213 and the first inclined surface 214, a pair of second inclined surfaces 215 between the side surface 213 and the lower surface 211, and an upper surface 212 disposed to face the lower surface 211.

An angle $\theta$ between the first inclined surface 214 and the display device 100 may be about 10 to 80 degrees. An angle $\alpha$ between the second inclined surface 215 and the display device 100 may be about 10 to 80 degrees. The angles between each of the first and second inclined surfaces 214 and 215 and the display device 100 may be substantially the same. In other words, the first and second inclined surfaces may have an inclination angle of about 10 to 80 degrees.

The one pair of lower surfaces 211 may be disposed on the edge portion of the display area V1 of the display device 100 and the one pair of first inclined surfaces 214 may be disposed on the first non-display area V21. That is, the one pair of lower surfaces 211 may be disposed on the edge portion the plurality of display panels 120 disposed adjacent to each other and the one pair of first inclined surfaces 214 may be disposed on the upper frame 110 of the plurality of display panels 120 disposed adjacent to each other. Accordingly, the transparent body 210 may be symmetrically disposed with respect to a boundary between the respective display devices 100.

The reflective member 220 may be disposed on the side surface 213 of the transparent body 210 and on the first inclined surface 214. The adhesive 230 may be disposed between the lower surface 211 of the transparent body 210 and the display panel 120.

Figure 7:
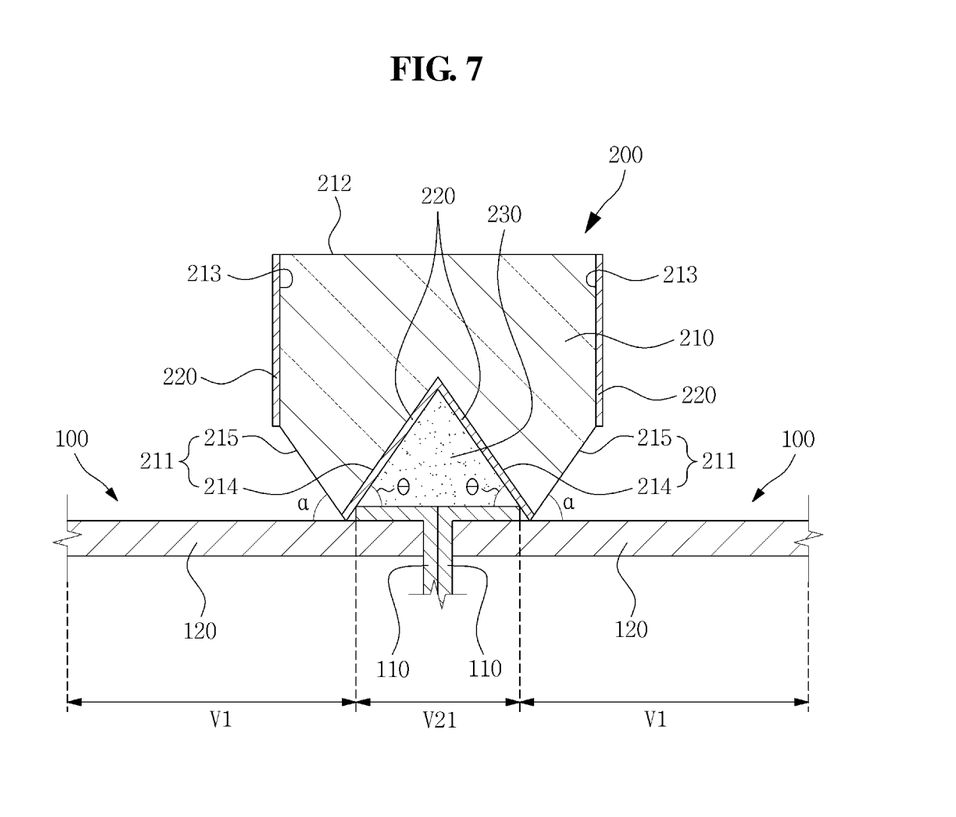
FIG. 7 is an enlarged cross-sectional view illustrating an optical apparatus according to a third embodiment of the present invention.

FIG. 7 is an enlarged cross-sectional view illustrating an optical apparatus according to a third embodiment of the present invention. The repeated descriptions of the optical apparatus according to the first embodiment of the present invention will be omitted.

Referring to FIG. 7, the optical apparatus 200 according to the third embodiment of the present invention may include a transparent body 210 disposed on the edge portion of the display area V1 and the first non-display area V21 of the display device 100, a reflective member 220 disposed on at least one surface of the transparent body 210, and an adhesive 230 configured to fix the transparent body 210 to the multi-display device.

The transparent body 210 may have a bar form extended along the edge portion of the display area V1 and the first non-display area V21.

The transparent body 210 may have a pair of side surfaces 213 substantially perpendicular to one surface of the display device 100, a pair of first inclined surfaces 214 disposed to face the first non-display area V21, a pair of second inclined surfaces 215 between the side surface 213 and the first inclined surface 214, and an upper surface 212.

An angle θ between the first inclined surface 214 and the display device 100 may be about 10 to 80 degrees. An angle α between the second inclined surface 215 and the display device 100 may be about 10 to 80 degrees. The angles between each of the first and second inclined surfaces 214 and 215 and the display device 100 may be substantially the same.

The one pair of first inclined surfaces 214 may be disposed on the first non-display area V21. That is, the one pair of first inclined surfaces 214 may be disposed on the upper frame 110 of the plurality of display panels 120 disposed adjacent to each other. Accordingly, the transparent body 210 may be symmetrically disposed with respect to a boundary between the respective display devices 100.

The reflective member 220 may be disposed on the side surface 213 of the transparent body 210 and on the first inclined surface 214. The adhesive 230 may be disposed between the first inclined surface 214 of the transparent body 210 and the upper frame 110.

Figure 8:
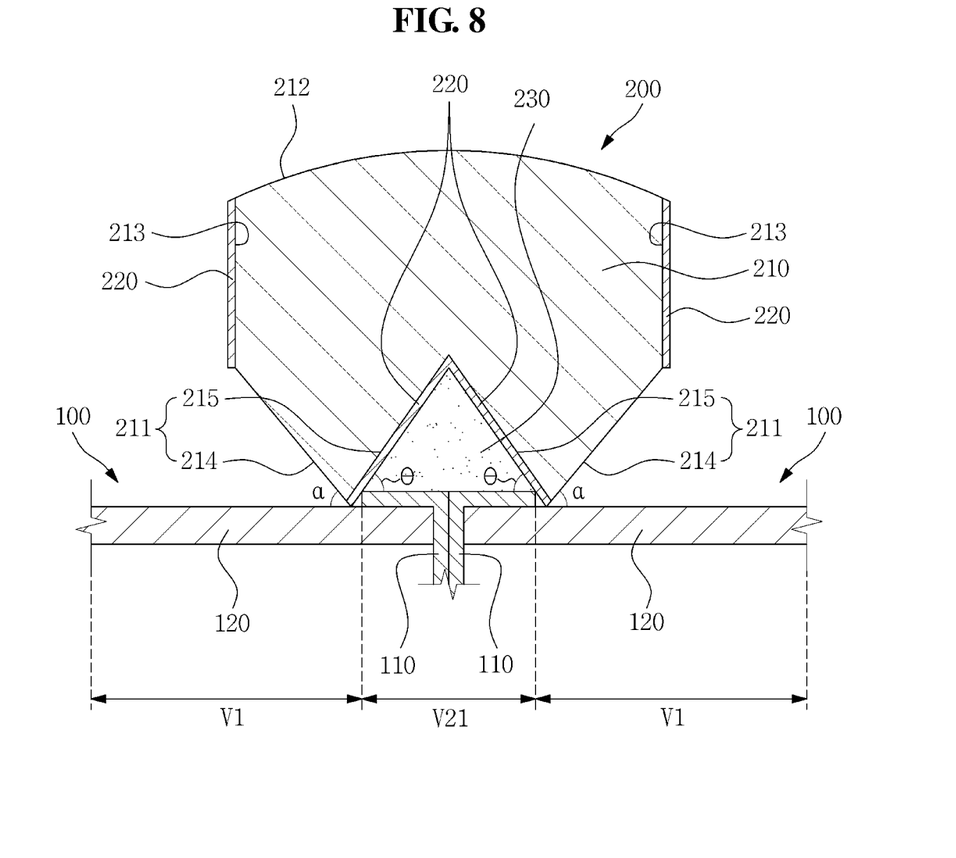
FIG. 8 is an enlarged cross-sectional view illustrating an optical apparatus according to a fourth embodiment of the present invention.
Figure 9:
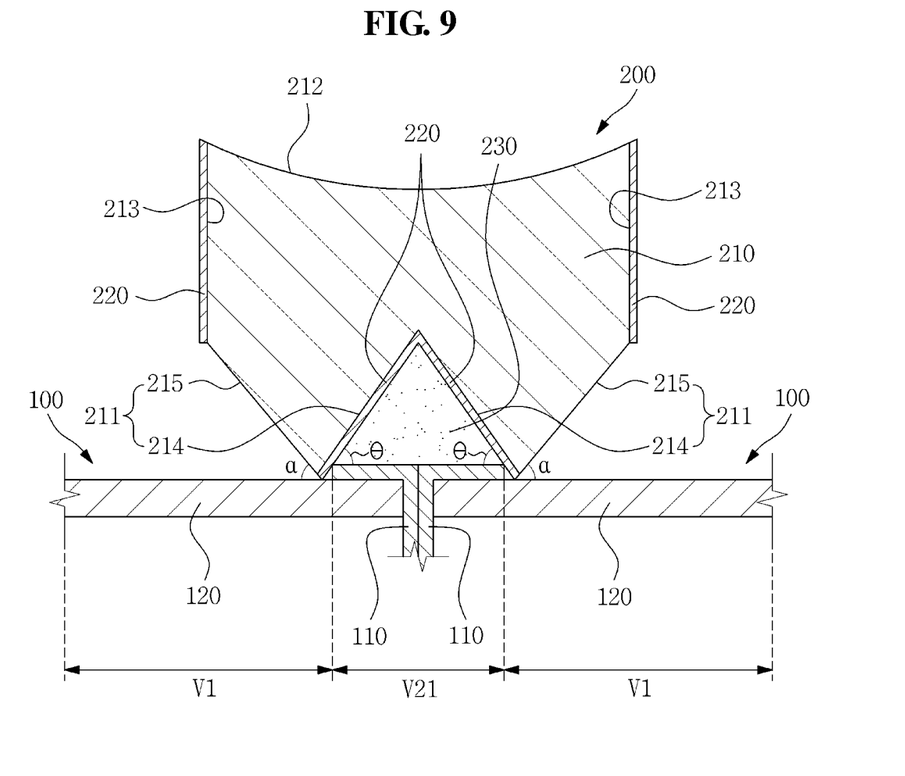
FIG. 9 is an enlarged cross-sectional view illustrating an optical apparatus according to a fifth embodiment of the present invention.

FIGS. 8 and 9 are enlarged cross-sectional views illustrating an optical apparatus according to fourth and fifth embodiments of the present invention.

Referring to FIGS. 8 and 9, the optical apparatus 200 according to the fourth and fifth embodiments of the present invention may include a transparent body 210 disposed on the edge portion of the display area V1 and the first non-display area V21 of the display device 100, a reflective member 220 disposed on at least one surface of the transparent body 210, and an adhesive 230 configured to fix the transparent body 210 to the multi-display device.

The transparent body 210 may have a bar form extended along the edge portion of the display area V1 and the first non-display area V21.

The transparent body 210 may have a pair of side surfaces 213 substantially perpendicular to one surface of the display device 100, a pair of first inclined surfaces 214 disposed to face the first non-display area V21, a pair of second inclined surfaces 215 between the side surface 213 and the first inclined surface 214, and an upper surface 212.

An angle θ between the first inclined surface 214 and the display device 100 may be about 10 to 80 degrees. An angle α between the second inclined surface 215 and the display device 100 may be about 10 to 80 degrees. The angles between each of the first and second inclined surfaces 214 and 215 and the display device 100 may be substantially the same. That is, the first and second inclined surfaces may have an inclination angle of about 10 to 80 degrees.

The transparent body 210 according to the fourth embodiment may include the upper surface 212 having a convex form and the transparent body 210 according to the fifth embodiment may include the upper surface 212 having a concave form.

The reflective member 220 may be disposed on the side surface 213 of the transparent body 210 and on the first inclined surface 214. The adhesive 230 may be disposed between the first inclined surface 214 of the transparent body 210 and the upper frame 110.

Figure 12:
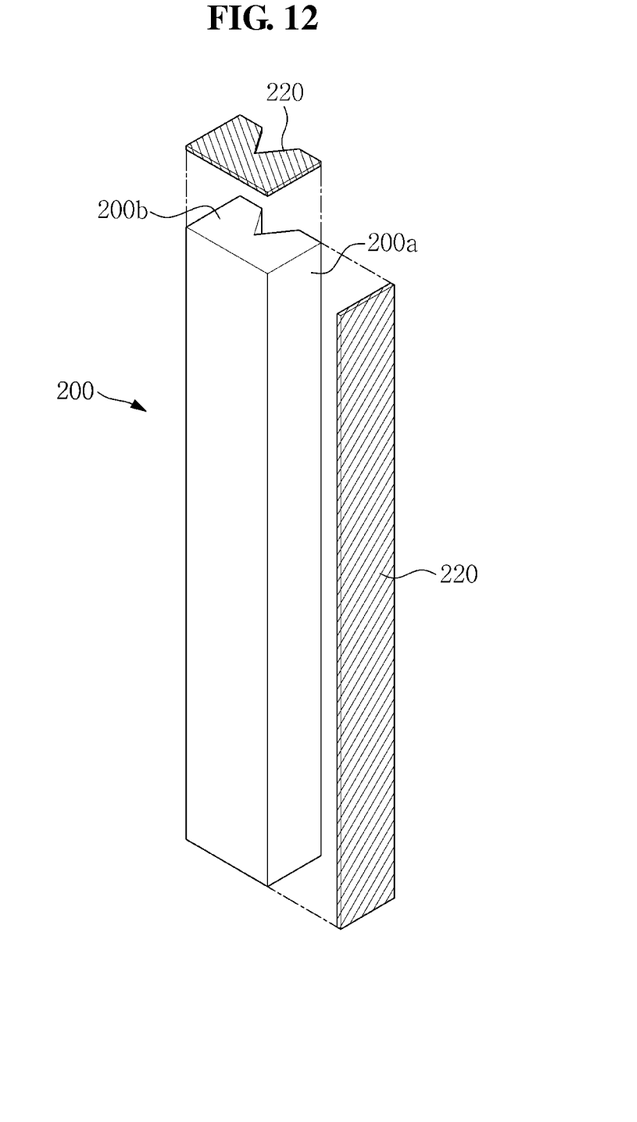
FIG. 12 is a view of an optical apparatus (200) having lengthwise side surfaces (200a) and side surfaces (200b) perpendicular to the lengthwise side surfaces (200a), with the reflective member (220) covering all the side surfaces.

FIG. 12 shows an embodiment of the optical apparatus (200) of the present invention, having a lengthwise side surface (200a) and a side surface (200b) perpendicular to the lengthwise side surface (200a) of the optical apparatus covered by the reflective member (220).

Figure 13:
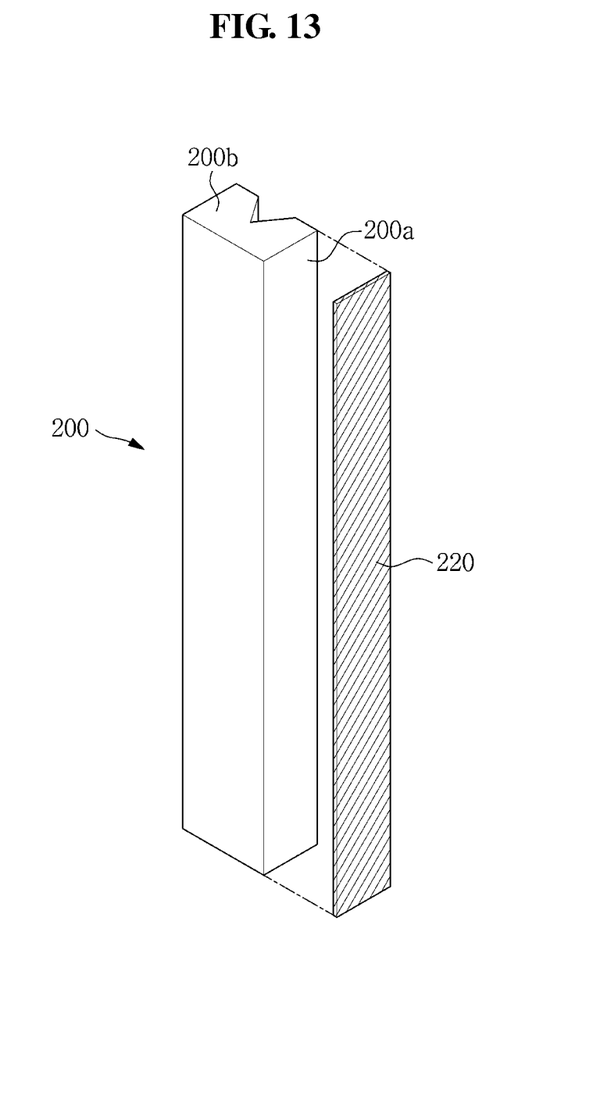
FIG. 13 is a view of another optical apparatus (200) having lengthwise side surface (200a) and side surface (200b) perpendicular to the lengthwise side surface (200a), with the reflective member (220) covering the lengthwise side surfaces (200a) and not covering the side surfaces (200b).

FIG. 13 shows another embodiment of the optical apparatus (200) of the present invention, having a lengthwise side surface (200a) covered by the reflective member (220) and the side surface (200b) perpendicular to the lengthwise side surface (200a) not covered by the reflective member (220).

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A multi-display device comprising:
    a plurality of display devices disposed adjacent to each other; and
    a plurality of optical apparatuses disposed on at least a part of a display area and a non-display area of a respective one of the plurality of display devices,
    wherein each of the plurality of optical apparatuses comprises:
        a transparent body having a side surface substantially perpendicular to one surface of the display device and a first inclined surface disposed to face the non-display area; and
        a reflective member disposed on the side surface and the first inclined surface.

2. The multi-display device of claim 1, wherein the optical apparatus is symmetric with respect to a boundary surface between the plurality of display devices.

3. The multi-display device of claim 2, wherein the optical apparatus further comprises a second inclined surface between the side surface and the first inclined surface.

4. The multi-display device of claim 3, further comprising an adhesive between the first inclined surface and the non-display area.

5. The multi-display device of claim 2, wherein the optical apparatus further comprises a second inclined surface between the side surface and a lower surface.

6. The multi-display device of claim 5, further comprising an adhesive between the lower surface and the display area.

7. The multi-display device of claim 1, wherein the first inclined surface has an inclination angle of 10 to 80 degrees.

8. The multi-display device of claim 3, wherein the second inclined surface has an inclination angle of 10 to 80 degrees.

9. The multi-display device of claim 5, wherein the second inclined surface has an inclination angle of 10 to 80 degrees.

10. The multi-display device of claim 2, wherein the optical apparatus has a convexly formed upper surface.

11. The multi-display device of claim 2, wherein the optical apparatus has a concavely formed upper surface.

12. The multi-display device of claim 1, wherein the transparent body comprises at least one substance selected from polycarbonate (PC), polymethylmethacrylate (PMMA), acrylonitrile-butadiene-styrene (ABS) copolymer and acrylic resins.

13. The multi-display device of claim 1, wherein the reflective member comprises at least one substance selected from gold (Au), silver (Ag), copper (Cu), aluminum (Al), chromium (Cr), titanium (Ti), and alloys thereof.

14. A multi-display device comprising:
a plurality of display devices disposed adjacent to each other; and
a plurality of optical apparatuses disposed on at least a part of a display area and a non-display area of a respective one of the plurality of display devices,
wherein each of the optical apparatuses comprises:
a transparent body having a side surface substantially perpendicular to one surface of the display device and a first inclined surface disposed to face the non-display area; and
an externally reflective member disposed on the side surface and another reflective member disposed on the first inclined surface,
the reflective member disposed on the side surface having a top edge with a height greater than the first inclined surface.

15. The multi-display device of claim 14, wherein the height of the top edge is defined within a range between about 2.5 mm or more and 3.5 mm or less.

16. The multi-display device of claim 6, wherein the adhesive is a transparent adhesive.

17. The multi-display device of claim 15, wherein the reflective member disposed on the side surface being flat.

18. The multi-display device of claim 15, wherein the reflective member is formed of polyethylene terephthalate (PET).

19. The multi-display device of claim 17, wherein a major surface of the reflective member is coated with a material containing metal including silver.

20. The multi-display device of claim 17, wherein a major surface of the reflective member is coated with a diffusion layer containing an inorganic oxide including titanium oxide.

* * * * *